United States Patent [19]

Eidelberg et al.

[11] 4,019,762
[45] Apr. 26, 1977

[54] RAINTIGHT CONNECTOR FOR ELECTRICAL CONDUIT

[75] Inventors: Jonah Eidelberg, Huntington Station; Thomas Mooney, Mount Sinai; Richard A. Bauer, Mastic Beach, all of N.Y.

[73] Assignee: I-T-E Imperial Corporation, E. Farmingdale, N.Y.

[22] Filed: Apr. 11, 1975

[21] Appl. No.: 567,378

Related U.S. Application Data

[63] Continuation-in-part of Ser. No. 501,084, Aug. 27, 1974, abandoned, which is a continuation of Ser. No. 297,657, Oct. 16, 1972, abandoned.

[52] U.S. Cl. .............................. 285/340; 285/341; 285/382.7
[51] Int. Cl.$^2$ ........................................ F16L 19/08
[58] Field of Search ....... 285/341, 342, 340, 382.7, 285/343, 379, 348, 248, 249, 261

[56] References Cited

UNITED STATES PATENTS

| | | | |
|---|---|---|---|
| 1,959,607 | 5/1934 | Anderson | 285/379 X |
| 2,316,806 | 4/1943 | Parker | 285/342 |
| 2,434,846 | 1/1948 | Hagan | 285/343 X |
| 2,452,277 | 10/1948 | Woodling | 285/382.7 X |
| 2,470,546 | 5/1949 | Carlson | 285/382.7 X |
| 2,474,319 | 6/1949 | Muller | 285/343 |
| 3,441,297 | 4/1969 | Koski | 285/342 |
| 3,485,517 | 12/1969 | Howe | 285/382.7 X |
| 3,733,093 | 5/1973 | Seiler | 285/348 |
| 3,794,362 | 2/1974 | Mooney et al. | 285/340 |

FOREIGN PATENTS OR APPLICATIONS

| | | | |
|---|---|---|---|
| 732,901 | 6/1932 | France | 285/340 |
| 1,114,891 | 12/1955 | France | 285/261 |
| 506,965 | 12/1954 | Italy | 285/341 |
| 723,400 | 2/1955 | United Kingdom | 285/340 |

*Primary Examiner*—Thomas F. Callaghan
*Attorney, Agent, or Firm*—Howard C. Miskin

[57] ABSTRACT

A vapor-proof connector on a metal electrical conduit includes an externally threaded tubular body engaging the end of the conduit and a gland nut spaced inwardly of and engaging the tubular body. The gland nut has an inwardly directed peripheral flange with a tapered inside face confronting a tapered end face of the body to delineate an annular space which surrounds the conduit and houses a channel-shaped split metal ring having inwardly directed diverging flanges and a wedge-shaped deformable gland ring arranged end to end so that tightening of the gland nut compresses the gland ring between the metal ring and the body or nut to radially compress the inside face of the gland ring and cause the split ring to bite and anchor to the conduit. Alternatively, the gland ring may be encircled by the split ring. The ends of the split ring may have opposing reduced width tongues extending therefrom. The gland ring has a coupling member extending radially outwardly into the circumference of the split ring and has a longitudinal bore therein which receives the tongue.

5 Claims, 9 Drawing Figures

RAINTIGHT CONNECTOR FOR ELECTRICAL CONDUIT

CROSS REFERENCE TO OTHER APPLICATION

This is a continuation-in-part application of the copening application, Ser. No. 501,084, filed Aug. 27, 1974, now abandoned, which is a continuation of application, Ser. No. 297,657, filed Oct. 16, 1972, now abandoned.

BACKGROUND OF THE INVENTION

The present invention relates generally to improvements in coupling devices for electrical conduits and it relates particularly to an improved connector for hermetically sealed attachment to relatively large diameter electrical condiut of the rigid metal type.

An electrical conduit in widespread use is of the rigid metal type. In order to maintain the vapor-proof integrity of an installation employing the vapor-proof metal conduit, it is necessary that any connectors or couplings associated with the conduit which facilitate its connection to junction boxes and other fittings be attached to the condiut in a firm vapor-proof or hermetically sealed manner. The couplings heretofore employed or proposed for attachment to rigid metal conduit possess numerous drawbacks and disadvantages. They are unreliable, generally complicated devices which are difficult and time-consuming to apply, they often do not produce a vapor-proof attachment to the conduit, particularly in the case of large diameter conduits, thereby failing to prevent the penetration of moisture and corrosive and solvent vapors, gasses and liguids into the conduit, and are of little versatility and adaptability and otherwise leave much to be desired.

SUMMARY OF THE INVENTION

It is a principal object of the present invention to provide an improved conduit coupling device.

Another object of the present invention is to provide an improved connector for large diameter electrical conduit.

Still another object of the present invention is to provide an improved coupling device for hermetically sealed attachment to rigid metal electrical conduit.

A further object of the present invention is to provide an improved screw connector for hermetically sealed attachment to vapor-proof rigid electrical conduit of large diameter.

Still a further object of the present invention is to provide a device of the above nature charcaterized by its reliability, ruggedness, simplicity, low cost, ease and convenience of operation and high versatility and adaptability.

The above and other objects of the present invention will become apparent from a reading of the following description taken in conjunction with the accompanying drawing which illustrates preferred embodiments thereof.

In a sense the present invention comtemplates the provision of a coupling device for an electrical conduit comprising first and second collars having mating inner and outer threaded sections and inner peripheral confronting faces delineating an annular space, a first relatively soft deformable sealing ring registering with the annular space and a second relatively stiff ring registering the said annular space and engagable with said first ring and at least one of the confronting faces to compress the first ring with the relative tightening of the first and second collars.

In the preferred form of the coupling device the inner collar defines an internally threaded gland nut and is axially inwardly disposed and provided at its inner end with an inwardly directed peripheral flange and the second collar defines a body which is externally threaded at opposite ends, and the confronting annular space delineating faces are tapered to diverge inwardly. The first ring includes a tapered end face registering with one of the annular space end faces and the second ring is split and channel-shaped, being provided with inwardly diverging flanges and is disposed end to end with the first ring.

In another form, instead of the rings being end to end, the first ring is encircled by the second ring. The first ring may be provided with a thin peripheral skirt which underlies one of the collar innermost faces. Also, the first ring may be provided with a coupling member extending radially outwardly into the circumference of the second ring and has a longitudinal bore therethrough. The ends of the second ring have tongues of reduced width directed toward each other and which are received in the longitudinal bore therethrough engaged by the tongue.

The improved coupling device is simple, rugged, and easy to apply and reliably produces a vapor-proof seal even when applied to large diameter conduit.

DESCRIPTION OF THE PREFERRED EMBODIMENTS

Figure 1:
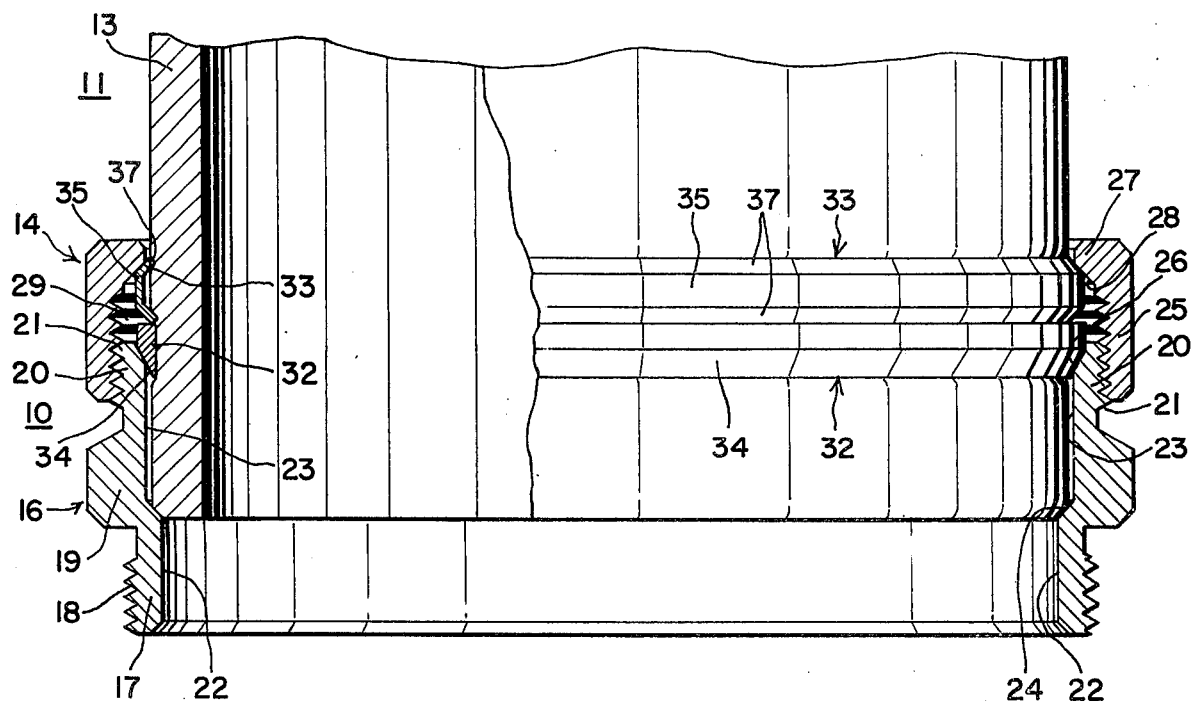
FIG. 1 is a front elevational view, partially in section, of a coupling device embodying the present invention, illustrated as applied to a metal electrical conduit.

Referring now to the drawing, particularly FIG. 1 thereof which illustrates a preferred embodiment of the present invention, the reference numeral 10 generally designates the improved coupling device which is applied to a metal electrical conduit 13 of conventional construction to form a sealed assembly 11. The conduit 13 is in the form of a thin walled rigid metal tube which is formed in the usual manner and may be of relatively large diameter.

The coupling device 10 comprises an inner gland nut defining first collar 14 and an outer body member defining second collar 16. The second collar 16 is an integrally formed unit and includes a front section 17 provided with an external connector thread 18, an intermediate section 19 provided with peripherally spaced outwardly projecting wings or flats for engagement by a suitable wrench, and an inner section 20 likewise provided with an external thread 21. The inside face 22 of collar section 17 is of a diameter between those of the outside and inside diameters of conduit 13, and the inside face 23 of intermediate and inner sections 19 and 20 is of slightly greater diameter than the outside diameter of conduit 13. The inside faces 22 and 23 are joined by a rearwardly outwardly inclined shoulder defining face 24 and the inner rear corner of inner body section 20 is likewise rearwardly outwardly inclined to provide a shoulder or face 26.

The first collar 14 includes a forward internally threaded section 25 which engages thread 21 and is provided at its rear with an inwardly directed peripheral lip 27 terminating at about the plane of face 23. The forward face of lip 27 is forwardly outwardly inclined to provide a shoulder defining lip 28. The confronting shoulders 26 and 28 and the inside face of collar 14 delineate an annular space 29.

Registering with the annular space 29 are a first gland defining sealing ring 32 and a second anchor and compression second ring 33, the rings 32 and 33 being in end to end relationship and coaxial with the collars 14 and 16 with the ring 32 being forward of the ring 33. The first ring 32 is formed of a relatively soft deformable or compressible material, which may be elastomeric, for example, a polyvinyl chloride or the like. The first ring 32 is peripherally continuous and its front outer face 34 is forwardly inwardly tapered and in the tightened conduit attached position of coupling 10 is wedged between the outer face of sheath 13 and tapered face 26.

The second ring 33 is formed of resilient metal and is split to permit its peripheral compression. Second ring 33 is of channel shape and includes an outer cylindrical peripheral web 35 and inwardly diverging side flanges 37 which, with the tightening of the coupling, bite into the conduit 13 and form a secure holding force.

The attachment of the coupling 10 to conduit 13 and a vapor-tight manner is simple. The coupling 10, with the gland nut 14 loosely engaging body threaded section 21, so that rings 32 and 33 are in their relieved expanded postions, with diameters slightly greater than the outside diameter of conduit 13, is slipped into engagement with conduit 13 until shoulder 24 engages the free outer corner of the conduit 13. The gland nut 14 is then tightened relative to body member 16 by the relative turning thereof to axially compress the end to end rings 32 and 33 between the contracting faces 26 and 28, the opposite free faces of rings 32 and 33 being engaged by faces 26 and 28 respectively. The ring 33 is peripherally compressed under the camming pressure of end face 28 to contract and bite into and firmly engage conduit 13. The first ring 32 under the influence of face 26 is radially compressed so that its inside face presses into and tightly and sealingly engages the outside face of conduit 13 to effect a vapor-proof seal therewith and the ring face 34 tightly engages collar face 26 to likewise form a vapor-proof seal therewith whereby the coupling 10 is firmly attached to conduit 13 in a hermetically sealed manner. Also, a ground is effected through metal ring 33 and coupling 10.

Figure 2:
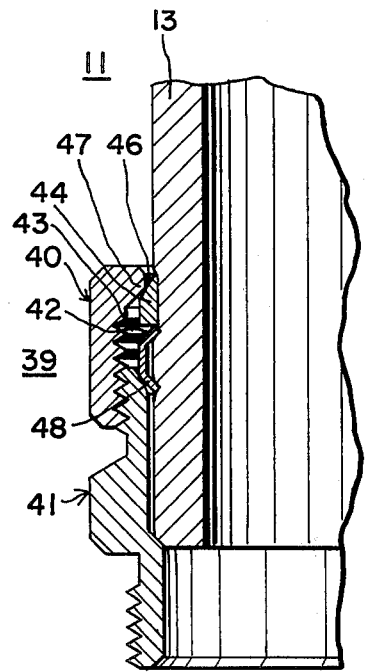
FIG. 2 is a fragmentary view similar to FIG. 1 of another embodiment of the present invention.

The embodiment of the present invention illustrated in FIG. 2 of the drawing differs from that shown in FIG. 1 only in the reversal of the arrangement of the anchoring and sealing rings and the configuration of the sealing ring. Specifically, the modified coupling 39 includes rear gland nut 40 and front body member 41 similar to gland nut 14 and body member 16 respectively, and a split ring 42 similar to ring 33 and positioned in the forward part of the annular space 43 in the coupling 39 corresponds to the annular space 29. A gland or sealing ring 44 is positioned in annular space 43 rearwardly of ring 42 and differs from sealing ring 32 in that its rear face 46 is rearwardly inwardly tapered.

The application and operation of coupling 39 are similar to those of coupling 10 except that the rear face 46 of ring 44 is engaged by the lip 47 of gland nut 40 and the front flange 48 of ring 42 is engaged by the inside corner face of body member 41. In all other respects the coupling members 10 and 39 and their operation and result are similar.

Figure 3:
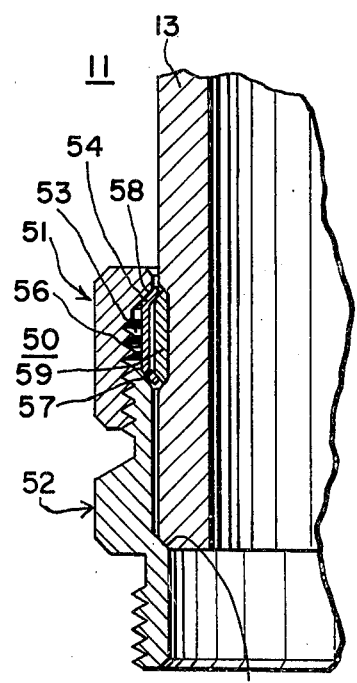
FIG. 3 is a view similar to FIG. 2 of still another embodiment of the present invention.

Referring now to FIG. 3 of the drawing which illustrates another embodiment of the present invention differing from those previously described in the shapes and relationships of the anchoring and sealing rings. The coupling 50 includes a rear gland nut defining collar 51 and a forward body member collar 52 similar to collars 14 and 16 respectively. Registering with the annular space 53 on the inside of coupling 50 is a split ring 54 formed of resilient metal and including an outer peripheral web 56 and inwardly diverging side flanges 57 whose outer faces are engaged by the confronting similarly inclinded inner corner faces 58 of collars 51 and 52.

A sealing ring 59 formed of a material similar to that forming sealing ring 32 is in the shape of a thick sleeve whose opposite edges are embraced by flanges 57. In the relaxed condition of ring 59 its inside diameter is greater than the outside diameter of conduit 13 and in the relaxed condition of ring 54 the diameter of the inside edges of flanges 57 is greater than the outside diameter of conduit 13. When the coupling 50 is slipped onto conduit 13 and the gland nut 51 is tightened, the opposing inclined faces of collars 51 and 52 which delineate annular space 53 engage the outside faces of flanges 57 to compress the ring 54 which in turn bears on ring 58 to radially compress it into the outer face of conduit 13 and effect a vapor-tight engagement therewith. In addition, as is the case in the other embodiments, the forward outer peripheral corner of conduit 13 is engaged by the shoulder 60 of body member 52 which corresponds to shoulder 24 to effect a vapor-tight seal along the front of the conduit.

Figure 4:
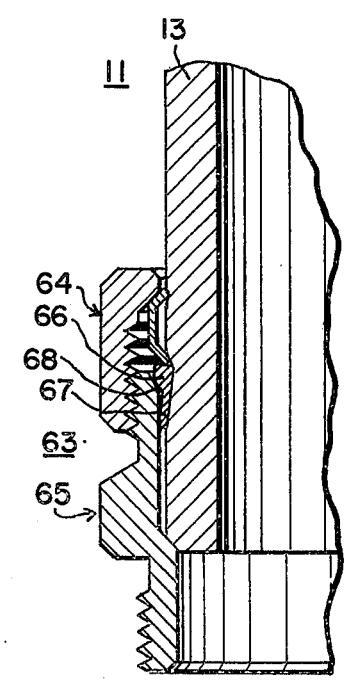
FIG. 4 is a view similar to FIG. 2 of a further embodiment of the present invention.
Figure 5:
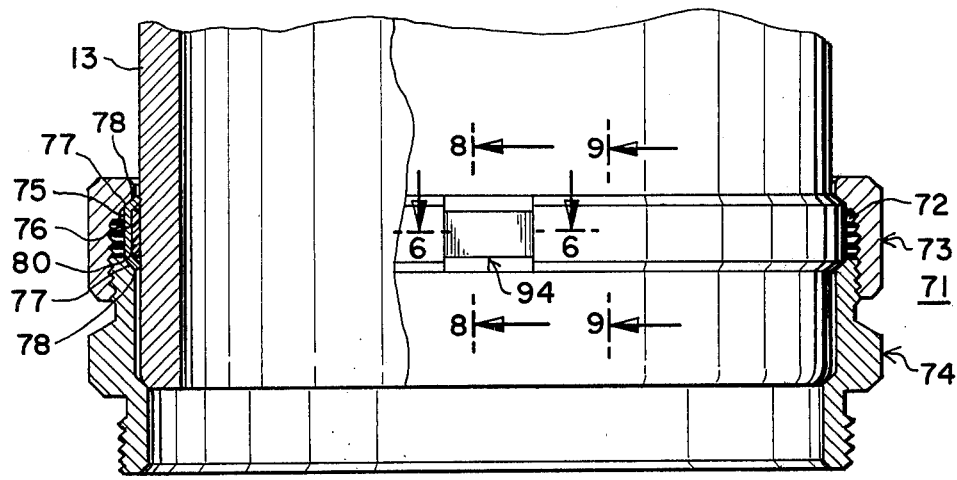
FIG. 5 is a front elevational view, partially in section of a still further embodiment.
Figure 6:
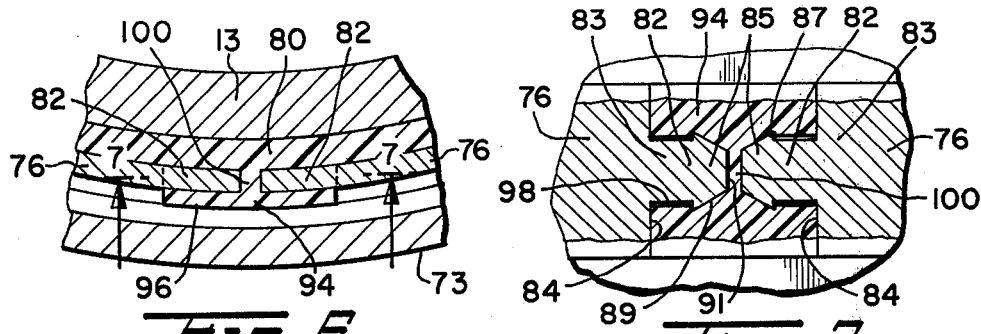
FIG. 6 is a cross sectional fragmentary view taken along line 6—6 of FIG. 5.
Figure 7:
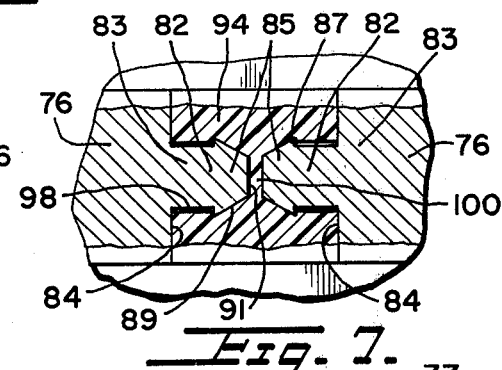
FIG. 7 is a fragmentary cross sectional view taken along line 7—7 of FIG. 5.
Figure 8:
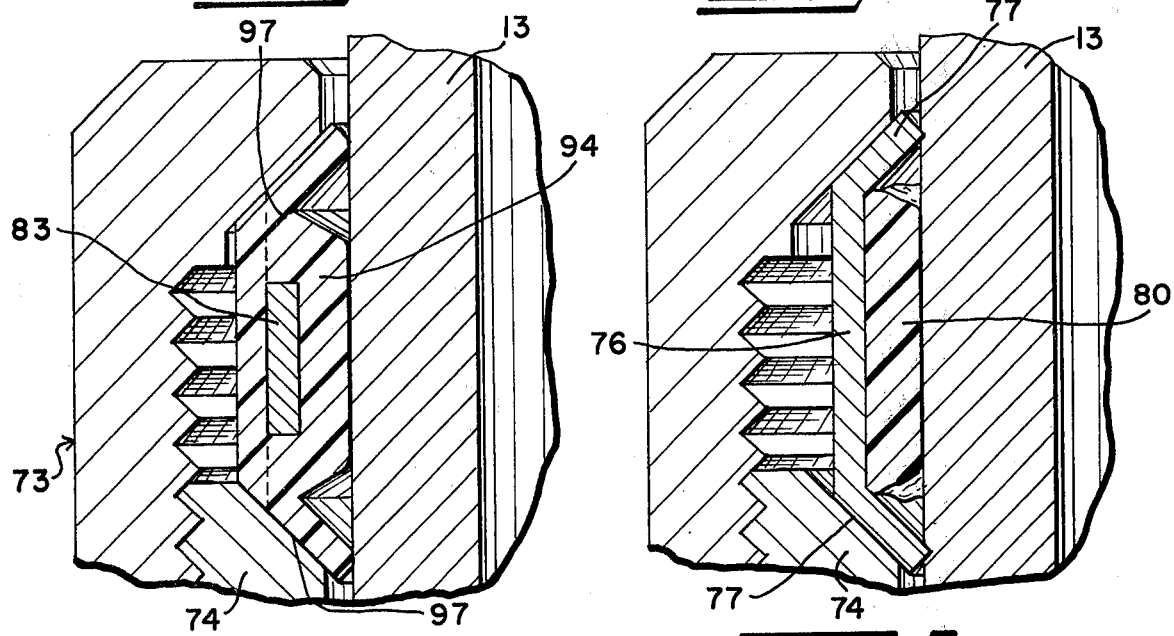
FIG. 8 is a fragmentary cross sectional view taken along line 8—8 of FIG. 5.
Figure 9:
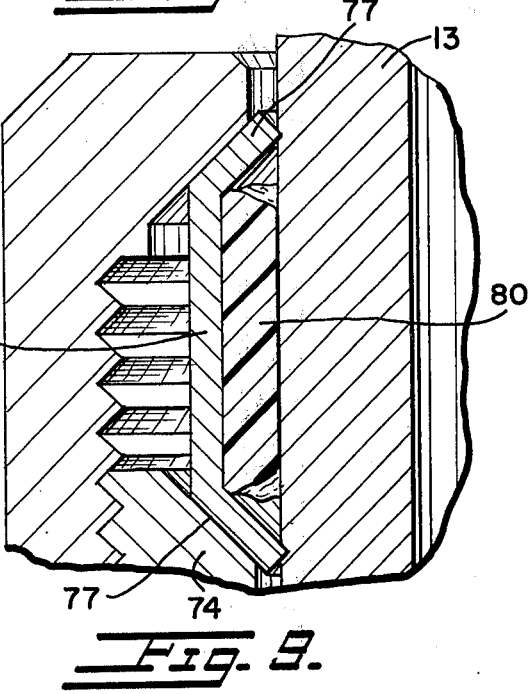
FIG. 9 is a fragmentary cross sectional view taken long line 9—9 of FIG. 5.

In FIG. 4 of the drawing, there is illustrated an improved coupling 63 which differs from that shown in FIG. 1 only in the configuration and functioning of the sealing ring. The coupling 63 includes rear and front collars 64 and 65 and channelshaped split metal ring 66 which correspond in structure and relationship to collars 14 and 16 and ring 33 respectively. The associated sealing ring 67 differs from sealing ring 32 in that it is provided with a thin integrally formed cylindrical skirt wall 67 which projects forwardly from the forward inner border of the forwardly inwardly inclined face 68 of sealing ring 66. The inside face sealing ring 66 including that of skirt wall 67 is coplanar and, in the attached tightened position of coupling 63, the skirt wall 67 projects into the space between and is at least partially tightly embraced by the confronting faces of conduit 13 and outer collar 65. In all other respects the couplings 10 and 63 are similar.

FIGS. 5-9 of the drawing illustrate another embodiment of the present invention differing from those previously described in the shape and relaionships of the anchoring and sealing rings. The coupling 71 includes a rear gland nut defining collar 73 and a forward body member collar 74 similar to collars 14 and 16 respectively of the embodiment first described above. Registering with the annular space 72 inside of coupling 71 is a split ring 75 formed of a resilient metal and including an outer peripheral web 76 and inwardly diverging side flanges 77, whose outer faces are engaged by the confronting similarly inclined corner faces 78 of collars 73 and 74. Sealing ring 80 is formed of a material similar to that forming sealing ring 32 and has a rectangular shaped cross section extending radially inwardly from web 76 and between diverging side flanges 77. Sealing ring 80 has a smaller inside diameter than the inside diameter of flanges 77. Split ring 75 is circumferentially contractible and is integrally formed with the confronting end faces of web 76, medially located, longitudinally aligned, similarly shaped tongues 82. Tongues 82 are of the same thickness as web 76 and each includes a rectangular shaped shank 83 of lesser width than web 76 and delineated from the end face of split ring 75 by flat vertical shoulders 84. Each tongue 82 includes a vertically enlarged head defining front end section 85 delineated from shank 82 by opposite vertical shoulders 87. The top and bottom faces 89 of head 85 converge forwardly from the sharp outer edges of shoulders 87 to the respective top and bottom edges of the vertical front face 91 of the head 85. The shoulders 84 and the tongue end faces 91 are advantageously flat.

In the relaxed condition of split ring 75, the front faces 91 of tongue 82 are circumferentially spaced from each other and in the fully contracted condition of ring 75 they are advantageously parallel.

Integrally formed with sealing ring 80 and extending radially outwardly into the circumference of split ring 75 is a protuberance or a coupling member 94. Sealing ring and coupling member are formed of a relatively soft resilient plastic material advantageously a synthetic organic polymeric resin, for example, a polyethylene or polyvinyl chloride or the like, but it must be resilient. Coupler member 94 has a generally similar outside transverse configuration to that of split ring 75, but is of greater thickness, i.e., about (0.0001) inch. Coupler member 94 includes a vertical longitudinally extending wall 96, which has extending therefrom inwardly diverging end faces 97. Medially formed in coupling member 94 is a longitudinal bore 98 of retangular shape whose top and bottom end faces may be flat or somewhat curved. Bore 98 is of a length somewhat greater than twice the length of tongue 82 including head 85 and of a width less than the vertical distance between the sharp outer edges of shoulders 87 and greater than the width of shank 83. Medially located in bore 98 and integrally formed with the body of sealing ring 80 and coupling member 94 is a transverse partition wall 100 which divides the bore 98 into opposite similar open ended sections.

In the assembled untightened condition of coupling 71, tongues 82 engage the opposite sections of bore 98 and the inner diameter of ring 80 is slightly greater than the outside diameter of the conduit 13 so that there is a sliding fit.

During assembly when the coupling 71 is tightened, the opposing inclinded faces 78 of the collars 73 and 74 which delineate the annular space in coupling 71 engage the outside faces of flanges 77 to compress ring 75 which in turn bears on sealing ring 80 to radially compress it into the outer face of conduit 13 and effect a vapor-tight engagement therewith. The edges of flanges 77 of the split ring 75 bit into the outside face of conduit 13 to effect a firm and hermetically sealing engagement therewith. In addition, the split ring shoulders 84 bear on coupling member 94 end faces to effect a fluid-tight engagement therewith and to longitudinally compress coupling member 94 and urging it and sealing ring 80 into fluid-tight engagement with conduit 13. The slight additonal thickness of coupling member 94 is compresesed during tightening to overlap the junction of the split ring and the space to provide a good fluid-tight seal. The tongue end faces advantageously approach but do not bear on partition wall 100, which spacing allows for minor variations in the diameter of the conduit and split ring and prevent the ends of the ring to abut and prevent a good seal with the conduit outer surface. The top edges of heads 85 bite into the top and bottom faces of bore 98 and the side faces of tongues 83 tightly engage the side faces of bore 98. As a result, the coupling device is firmly anchored and hermetically sealed to conduit 13.

While the ends of split ring 75 are shown to have heads with tongues, these could be eliminated. Similarly heads 85 need not have shoulders 87.

While there have been described and illustrated preferred embodiments of the present invention, it is apparent that numerous alterations, omissions and additions may be made without departing from the spirit thereof.

What is claimed is:

1. A connector device for an electrical conduit comprising first and second collars having mating inner and outer threaded sections and inner axially spaced confronting faces delineating an annular space, a first relatively soft deformable sealing ring registering with said annular space and a second relatively stiff ring of a resilient metal encircling said first ring and split across the circumference thereof to form confronting end faces and including tongues of reduced width directed toward each other and extending from said end faces, said first ring having a protuberance extending radially outwardly therefrom into the circumference of said second ring and disposed between said ring end faces, said protuberance having a longitudinal bore peripherally aligned with and engaged by said tongues, said split ring being entrapped between said collar confronting faces and being compressible thereby to bring said ring end faces into compressible sealing engagement within said protuberance.

2. The connector device of claim 1 wherein said protuberance includes a transverse wall extending across said bore between the ends thereof, the confronting ends of said tongue facing the opposite faces of said transverse wall.

3. The connector device of claim 2 wherein said tongues are longitudinally aligned and are delineated from said split ring by upper and lower shoulders defining said confronting end faces which are in hermetically sealing engagement with the end faces of said protuberance.

4. The device of claim 1 wherein said second ring includes axially spaced diverging annular flanges.

5. The device of claim 4 wherein said annular flanges engage the borders of said first ring.

* * * * *